(12) United States Patent
Knight-Newbury et al.

(10) Patent No.: US 7,159,685 B2
(45) Date of Patent: Jan. 9, 2007

(54) SAFETY ARRANGEMENT FOR A VEHICLE (75) Inventors: Heath Knight-Newbury, Brighton (GB); John Macari, West Sussex (GB)

(73) Assignee: Autoliv Development AB, Vargarda (SE)

( * ) Notice: Subject to any disclaimer, the term of this patent is extended or adjusted under 35 U.S.C. 154(b) by 392 days.

(21) Appl. No.: 10/471,439

(22) PCT Filed: Mar. 11, 2002

(86) PCT No.: PCT/SE02/00433

§ 371 (c)(1),
(2), (4) Date: Feb. 11, 2004

(87) PCT Pub. No.: WO02/072393

PCT Pub. Date: Sep. 19, 2002

(65) Prior Publication Data

US 2004/0124621 A1    Jul. 1, 2004

(51) Int. Cl.
*B60R 21/34* (2006.01)
(52) U.S. Cl. .................. 180/274; 296/187.04
(58) Field of Classification Search .......... 296/193.11, 296/187.03, 187.06, 187.04, 187.09, 187.1; 180/274, 271; *B60R 21/34; B62D 25/10, B62D 25/12*
See application file for complete search history.

(56) References Cited

U.S. PATENT DOCUMENTS

| | | | |
|---|---|---|---|
| 4,249,632 A * | 2/1981 | Lucchini et al. | |
| 5,409,256 A * | 4/1995 | Gordon et al. | |
| 5,445,406 A * | 8/1995 | Jones | |
| 5,501,484 A * | 3/1996 | Saderholm et al. | |
| 5,560,642 A | 10/1996 | Davidson et al. | |
| 5,806,882 A | 9/1998 | Stein et al. | |
| 5,839,756 A | 11/1998 | Schenck et al. | |
| 5,868,422 A | 2/1999 | Galbraith et al. | |
| 6,364,402 B1 * | 4/2002 | Sasaki | |
| 6,439,330 B1 * | 8/2002 | Paye | |
| 6,520,276 B1 * | 2/2003 | Sasaki et al. | |
| 6,530,449 B1 * | 3/2003 | Sasaki et al. | |
| 6,543,086 B1 * | 4/2003 | Bjureblad et al. | |
| 6,571,901 B1 * | 6/2003 | Lee | |
| 6,668,962 B1 | 12/2003 | Son | |
| 6,736,425 B1 * | 5/2004 | Lemon et al. | |
| 6,758,493 B1 | 7/2004 | Conlee et al. | |
| 6,874,811 B1 | 4/2005 | Enders et al. | |
| 6,938,715 B1 | 9/2005 | Hamada et al. | |
| 6,964,316 B1 * | 11/2005 | Polz et al. | 180/274 |
| 7,000,720 B1 * | 2/2006 | Polz et al. | 180/69.21 |
| 2003/0121710 A1 * | 7/2003 | Hamada et al. | 180/274 |
| 2004/0112664 A1 * | 6/2004 | Fredriksson et al. | 180/274 |
| 2004/0124621 A1 | 7/2004 | Knight-Newbury et al. | |
| 2005/0257980 A1 * | 11/2005 | Green et al. | |

(Continued)

FOREIGN PATENT DOCUMENTS

DE       28 14 107       10/1979

(Continued)

*Primary Examiner*—Phil N. Dickson
*Assistant Examiner*—Leonard McCreary, Jr.
(74) *Attorney, Agent, or Firm*—Madson & Austin (57) ABSTRACT

Safety arrangement comprising a unit to be located beneath a bonnet of a motor vehicle. The unit is adapted to become of increased length in response to a signal from a sensor and may comprise a bellows-sleeve and a gas generator. The unit has a catch arrangement adapted to engage part of the bonnet structure so that part of the bonnet structure is engaged and retained when the length of the unit is increased.

30 Claims, 6 Drawing Sheets

U.S. PATENT DOCUMENTS

2005/0285431 A1* 12/2005 Rex et al.
2006/0060408 A1 3/2006 Kalliske et al.

FOREIGN PATENT DOCUMENTS

| | | |
|---|---|---|
| DE | 197 21 565 A1 | 12/1997 |
| DE | 19721565 | 12/1997 |
| DE | 199 22 455 C1 | 10/2000 |
| DE | 100 33 200 | 2/2001 |
| DE | 10022094 | 12/2001 |
| DE | 10063586 | 8/2002 |
| DE | 10247801 | 4/2004 |
| EP | 0 967 128 | 12/1999 |
| EP | 0 967 128 A2 | 12/1999 |
| EP | 1 138 559 | 10/2001 |
| EP | 1 138 559 A1 | 10/2001 |
| GB | 2387577 | 10/2003 |
| JP | 07 125604 | 5/1995 |
| JP | 07-125607 | 5/1995 |
| JP | 07125604 A | 5/1995 |
| JP | 08-324380 | 12/1996 |
| JP | 10 152018 | 6/1998 |
| JP | 10-258774 | 9/1998 |
| JP | 11310158 A | 11/1999 |
| JP | 2004-203062 | 7/2004 |
| WO | WO-00/50270 | 8/2000 |
| WO | WO 01/23226 A1 | 4/2001 |
| WO | WO 2004/108486 | 12/2004 |

\* cited by examiner

SAFETY ARRANGEMENT FOR A VEHICLE

BACKGROUND OF THE INVENTION

1. Field of the Invention

THE PRESENT INVENTION relates to a safety arrangement, and more particularly relates to a safety arrangement for a motor vehicle.

2. Description of Related Art

When a motor vehicle, such as a motor car, is involved in an accident in which the front part of the vehicle strikes a pedestrian, it is not uncommon for the head of the pedestrian to be brought forcibly into contact with the hood or bonnet of the vehicle. This may cause the hood or bonnet to deform, but, in many cases, that deformation is arrested as the hood or bonnet engages part of the engine block, or other component within the engine compartment, immediately beneath the hood or bonnet. As a consequence, the movement of the head of the pedestrian is suddenly stopped, and the head of the pedestrian is thus subjected to a very severe deceleration, which is undesirable.

It has been proposed previously to provide one or more inflatable elements located adjacent the rear edge of the hood or bonnet adapted to be inflated in an accident situation of the type described, so that the rear edge of the hood or bonnet is lifted, thus spacing hood or bonnet from the engine block, or other components, within the engine compartment. This enables the head of a pedestrian, if it strikes a hood or bonnet in an accident of the type under consideration, to be decelerated gradually, as the hood or bonnet deforms.

The inflatable elements that have been previous proposed, have been conventional air-bags, which suffer from the disadvantage that they do not remain inflated for a period of time long enough to provide an adequate degree of protection for a pedestrian during a typical accident situation, and also may accelerate the hood or bonnet to such an extent that the hood or bonnet moves upwardly to such an extent that the pedestrian is injured.

SUMMARY OF THE INVENTION

The present invention seeks to provide an improved safety arrangement.

According to one aspect of this invention there is provided a safety arrangement for a vehicle having a hood or bonnet, the safety arrangement comprising a unit adapted to be located beneath the rear part of the hood or bonnet, the unit incorporating means to increase the length of the unit in response to a signal from a sensor, the unit carrying a catch adapted to engage and retain part of the bonnet structure when the length of the unit is increased.

According to another aspect of this invention there is provided a safety arrangement in a vehicle having a hood or bonnet, the safety arrangement comprising a unit located beneath the rear part of the hood or bonnet, the unit incorporation means to increase the length of the unit in response to a signal from a sensor, the unit carrying a catch adapted to engage and retain part of the bonnet structure when the length of the unit is increased.

Preferably the unit is provided with a boss provided with two diametrically opposed spring clips which constitute the catch.

Conveniently the boss is provided with a conical or tapering upper surface, each spring clip being provided with a free arm defining an inclined portion which is co-aligned with the conical surface, the lower end of which terminates with a radially inwardly directed arm.

Advantageously the unit incorporates a base, the base carrying a pyrotechnic charge, the unit further incorporating an upper plate carrying the boss, there being means connecting the base and the upper plate adapted to increase in length on actuation of the gas generator.

Conveniently part of the unit, when the length thereof has been increased, is capable of plastic deformation.

In one embodiment the means between the base and the upper plate comprise a sleeve formed of a plastically deformable material.

Preferably the sleeve is provided with corrugations.

In another embodiment the means between the base and the top plate comprise a piston and cylinder arrangement.

Preferably the piston incorporates a piston rod of plastically deformable material and means are provided to retain the piston in an extended position.

Conveniently the unit is provided with means which enable the unit to be connected to part of the vehicle with a screwing action.

Preferably the unit is provided with a quarter turn screw or a bayonet-type connection to secure the unit to part of the vehicle beneath the hood or bonnet.

Advantageously the bonnet structure is provided with an aperture to receive said catch, the aperture having a first dimension in one direction, and a second larger dimension in another direction so that after the catch has engaged an edge of the aperture, a quarter turn will release the catch.

In an alternative embodiment the unit incorporates an air-bag, the air-bag carrying the catch adapted to engage and retain part of the bonnet structure.

Preferably the air-bag incorporates a sleeve formed from a material that does not permit substantial radial expansion of the sleeve.

Conveniently the sleeve is formed of fabric.

Preferably the sleeve is provided with an inner lining of substantially gas-tight material.

Conveniently the upper part of the sleeve is trapped in a substantially gas-tight manner between two inter-engaging elements, one of the inter-engaging elements carrying said catch.

Preferably the catch comprises a catch plate adapted to engage and retain a barb that forms part of the bonnet structure.

Preferably the lower end of the sleeve is received within a groove formed in a base block.

In a preferred embodiment the air-bag is of cylindrical form, but alternatively the air-bag may be conical with a broad base and a narrow top carrying the catch.

BRIEF DESCRIPTION OF THE DRAWINGS

In order that the invention may be more readily understood, and so that further features thereof may be appreciated, the invention will now be described by way of example with reference to the accompanying drawings in which.

DETAILED DESCRIPTION OF THE INVENTION

Referring initially to FIGS. 1 to 4 of the accompanying drawings, the safety arrangement in accordance with the present invention is illustrated.

Part of the inner wing structure 1 is provided with a recess or depression 2, that recession or depression 2 having an aperture 3 formed in the base thereof. Aperture 3 is of circular form provided with two radially inwardly directed diametrically opposed lugs 4, 5, which have inclined lower surfaces 6, 7, to form part of a quarter-turn screw or "bayone"-type fixing.

Located above the inner wing structure is the hood or bonnet 8 which is provided, on its lower surface, with a stiffening structure or reinforcing beam 9. An aperture or cut-out 10 is provided in the stiffening structure 9 at a position above the aperture 3. The cut-out 10 is of a cruciform shape having a first pair of opposed arms 11, 12 and, orthogonally arranged to the first pair of arms a second pair of slightly longer opposed arms 13, 14.

A unit incorporating an inflatable element 15 is provided. The inflatable element is mounted on a base 16. The outer part of the base 16 is provided with two helical projections 17, 18 which are diametrically opposed and which are adapted to engage with the projections 4, 5 of the aperture 3 to form a quarter-turn screw fixing or a bayonet fixing. The base 16 may thus be connected to or disconnected from the aperture 3 in the inner wing structure with a straightforward screwing action.

Figure 2:
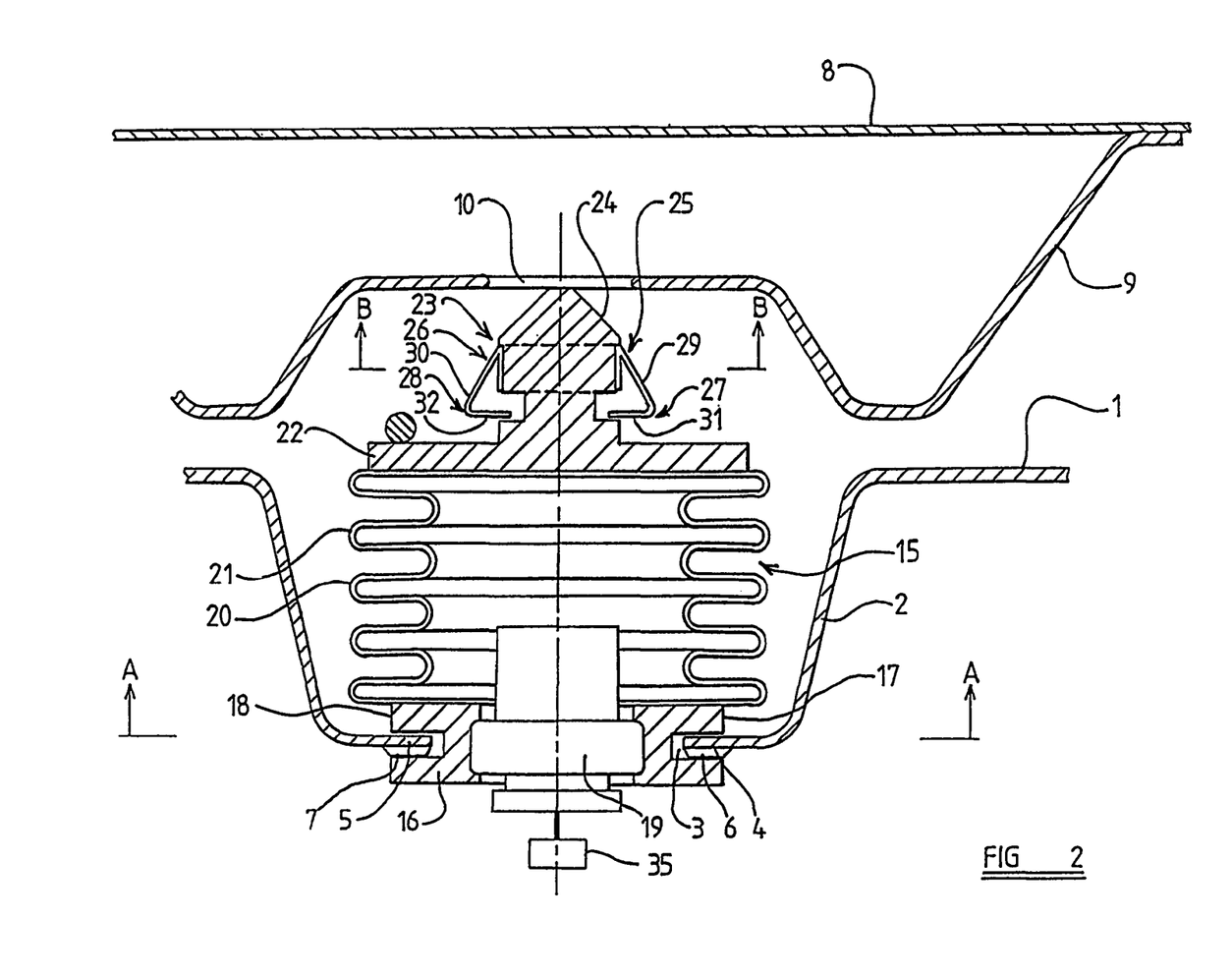
FIG. 2 is a diagrammatic sectional view of part of the safety arrangement of FIG. 1.
Figure 3:
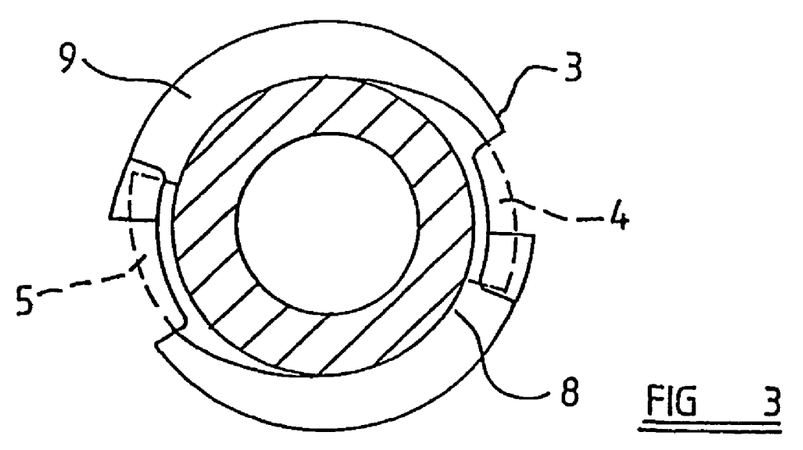
FIG. 3 is a sectional view taken on the line A—A of FIG. 2.
Figure 4:
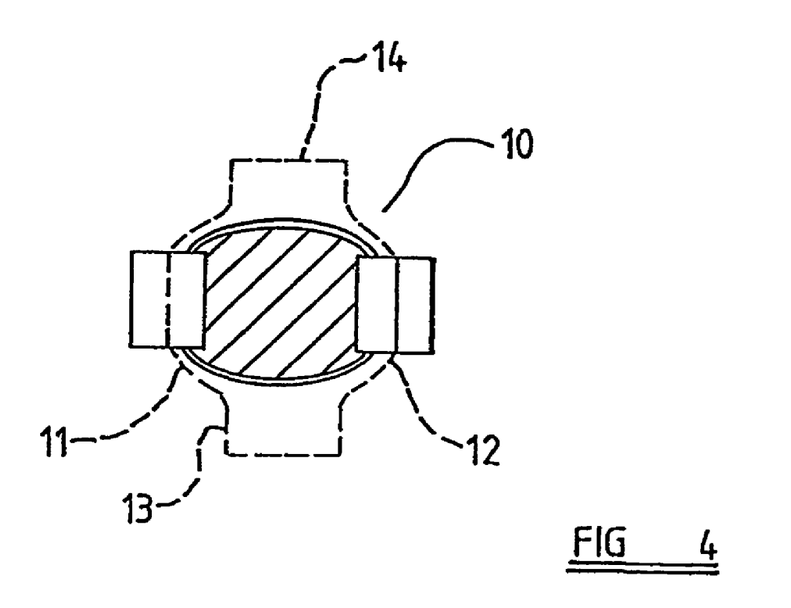
FIG. 4 is a sectional view taken on the line B—B of FIG. 2.

The base 16 is provided with a central aperture 18 that receives a pyrotechnic inflator or gas generator 19. The base 16 is sealingly connected to one end of a sleeve 20 formed of a plastically deformable material, such as metal in the form of steel, so that gas from the gas generator may be injected into the sleeve 20. The sleeve 20 is provided with a plurality of corrugations 21. The corrugations may be provided by pressure forming the sleeve in an appropriate die or, alternatively, by processing the sleeve using co-operating rollers upon the interior and exterior of the sleeve as the sleeve rotates. The upper end of the sleeve is sealingly connected to an upper plate 22. The upper plate 22 carries an upwardly directed boss 23, which has a conical or tapering upper surface 24. The boss is provided with two diametrically opposed spring clips 25, 26. Each spring clip is provided with a free arm 27, 28 defining an inclined portion 29, 30, which is co-aligned with said conical surface, the lower end of which terminates with a radially inwardly directed arm 31, 32. The arms 31, 32 are spaced above the upper surface of the upper plate 22. The spring clips 25, 26 are co-aligned with the shorter arms 11, 12 of the crucifix-shaped engagement cut-out 10.

Figure 1:
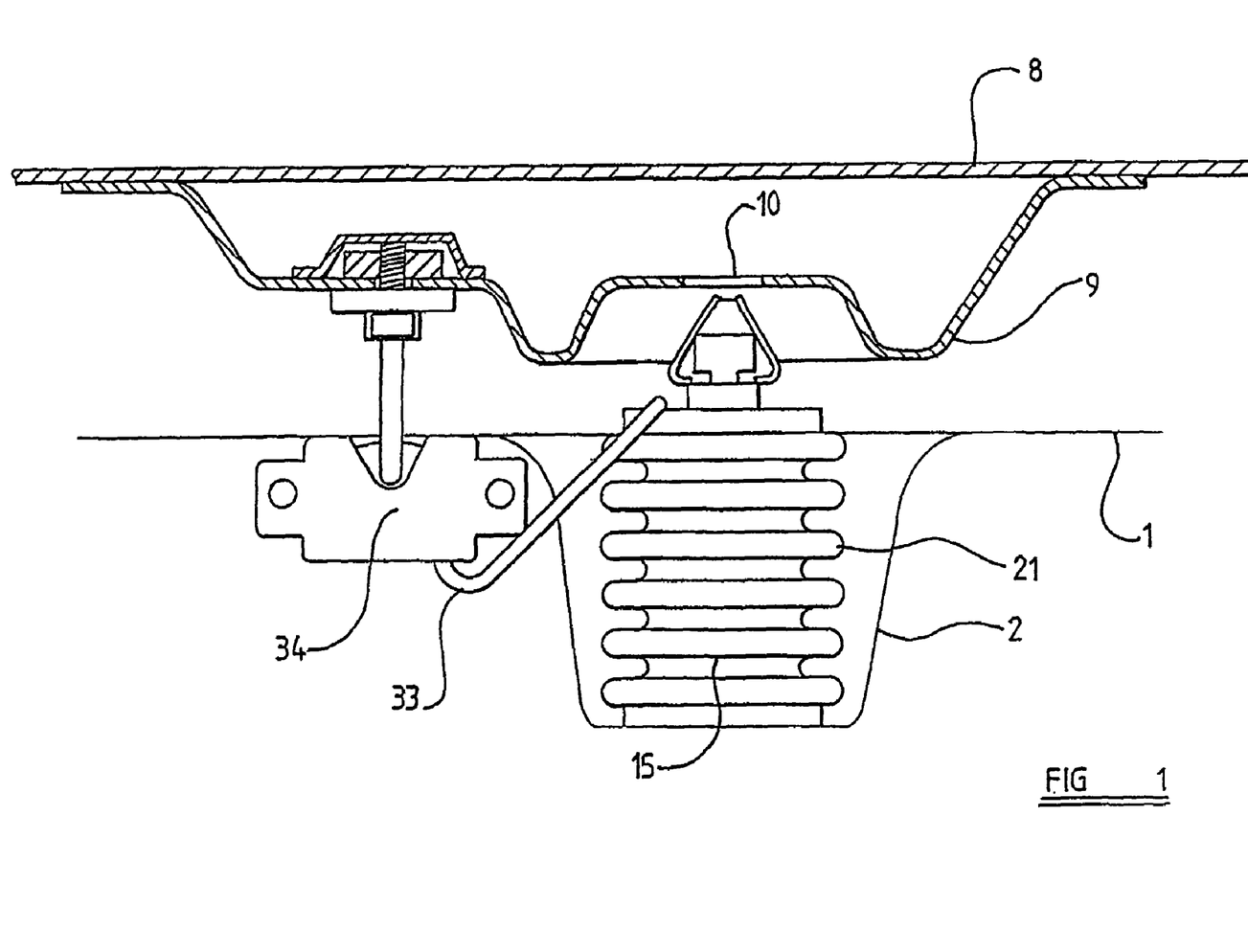
FIG. 1 is a side view of part of a safety arrangement in accordance with the invention mounted on a motor vehicle.
Figure 5:
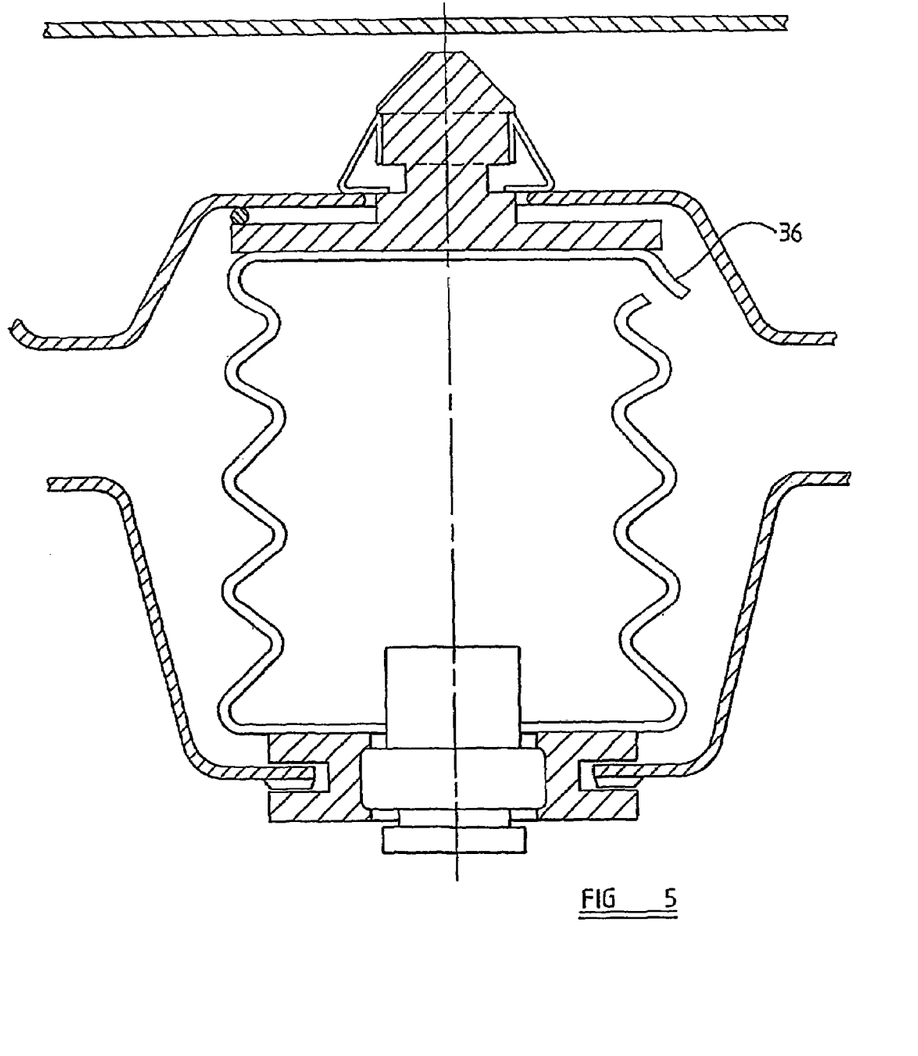
FIG. 5 is a view corresponding to FIG. 2, showing the arrangement in FIG. 1 following an accident.

The upper plate 22 is secured to a bonnet latch release arm 33 which, as can be seen from FIGS. 1 and 5, extends to a bonnet catch 34. The bonnet catch 34 may be the ordinarily provided bonnet catch if the bonnet is a bonnet of the type that is provided with hinges or other pivotal mounting means at the front of the bonnet, but if the bonnet is of the type which is provided with rear hinges, the bonnet catch is adapted to retain the hinges in position. In any event, it is to be understood that when the bonnet catch 34 is released, the rear edge of the hood or bonnet 8 is free to move upwardly.

A sensor 35 is provided which may be mounted on the front bumper of the motor vehicle, adapted to sense an impact with a pedestrian. The sensor 35 is connected to the gas generator or inflator 19.

When the sensor 35 senses an impact with a pedestrian, and passes a signal to the inflator, the inflator 19 is actuated and gas from the inflator 19 passes into the interior of the sleeve 20. The sleeve expands, with the upper plate 22 moving upwardly. Thus the length of the sleeve 20 is increased. As the upper plate 22 moves upwardly, the boss 23 is directed through the cut-out 10 by the conical surface 24, and the inclined parts 29 and 30 of the free arms 27, 28 and spring slips 25, 26, engage against the ends of the relatively short arms 11, 12 of the cruciform-shaped cut-out 10, thus flexing inwardly. As the spring clips 25, 26 pass completely through the engagement cut-out 10, the resilient arms 25 and 26 flex back to their initial position with the horizontal, inwardly directed portions 31, 32 engaging the metal in the bonnet stiffening structure 9 to either side of the engagement cut-out 10 beyond the ends of the relatively shortly arms 11, 12 of the cruciform. Thus parts of the bonnet stiffening structure are trapped between the spring clips 25, 26 and the upper plate 22.

As the upper plate 22 moves upwardly, the bonnet reaction release arm 33 is moved, thus releasing the bonnet catch 34.

As the sleeve 20 continues to expand, the rear part of the bonnet 8 is moved upwardly, as shown in FIG. 5. Thus, should the head of a pedestrian strike the bonnet, the risk of the movement of the head being arrested, on deformation of the bonnet, due to the impact of the bonnet with the engine block or other component located within the engine compartment, is minimised. Also, as the head of a pedestrian strikes the hood or bonnet, a downward force will be applied to the extended sleeve 20, causing the extended sleeve 20 to be re-compressed with a plastic deformation, thus absorbing energy.

One or more vents may be provided, such as the flap 36 which may be adapted to be opened when subjected to a predetermined pressure of gas, to vent the gas from the interior of the expanded sleeve.

The engagement of the spring clips 25, 26 with the bonnet stiffening structure serves to hold the rear edge of the bonnet in place and prevents the bonnet tipping forwardly in an undesired manner.

Following deployment of the safety device, the rear edge of the bonnet will remain in a lifted condition. If it is desired to return the hood or bonnet to its initial condition, the sleeve 20 may be grasped manually and may be rotated by 90°, thus disengaging the lower half-turn screw or bayonet fixing, and also moving the spring clips 25, 26 into alignment with the longer arms 13, 14 of the cruciform-shaped opening 10, thus enabling the unit to be disconnected from both the inner wing structure and the bonnet stiffening structure.

Figure 6:
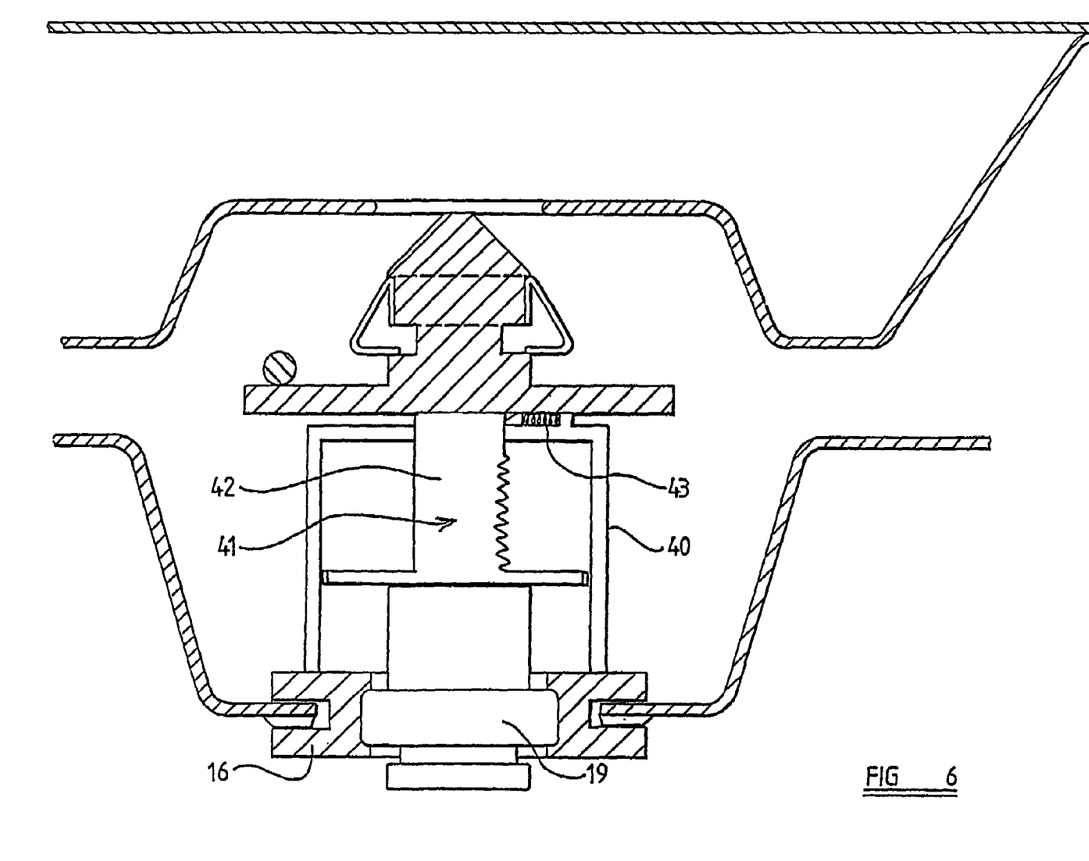
FIG. 6 is a view corresponding to FIG. 2, illustrating an alternative embodiment of the invention.

Whilst the invention has been described above with reference to an embodiment in which an inflatable element is used which has a side wall formed of a plastically deformable material, FIG. 6 illustrates an alternative embodiment of the invention in which a unit is provided wherein the base plate 16 carries a cylinder 40 adapted to receive gas from the pyrotechnic inflator. A piston 41 is contained within the cylinder adapted to move in response to the supply of gas from the inflator to increase the length of the unit, and the piston 41 is provided with a piston rod 42 which supports the upper cover. The piston rod 42 is provided with a ratchet arrangement 43 so that, once the piston has moved to an extended position, the piston cannot return to the initial position. The piston rod 42 may be formed of a plastically deformable material.

It is to be appreciated that in use of the embodiment shown in FIG. 6, on actuation of the inflator 19, the piston 41 will move from an initial retracted position to an extended position, and will be retained in the extended position by the operation of the ratchet 43. The bonnet will thus, as in the embodiment described above, be lifted. Should the head of the pedestrian strike the bonnet, applying a down-force to the bonnet, the piston rod 41 may deform plastically, thus absorbing energy.

It is to be appreciated that a safety device of the type described above may easily be mounted on the vehicle, when the vehicle is on the production line, and even if there is a slight mis-alignment, the device will still operate in the intended manner, as the conical head 24 will always "self-align" with the engagement cut-out 10. Because the described unit does not form a constant connection between the bonnet and the inner wing structure, the bellows or the piston will not be subjected to any forces liable to cause metal fatigue. The installation may be compact and unobtrusive, and thus is unlikely to be damaged during vehicle servicing.

Figure 7:
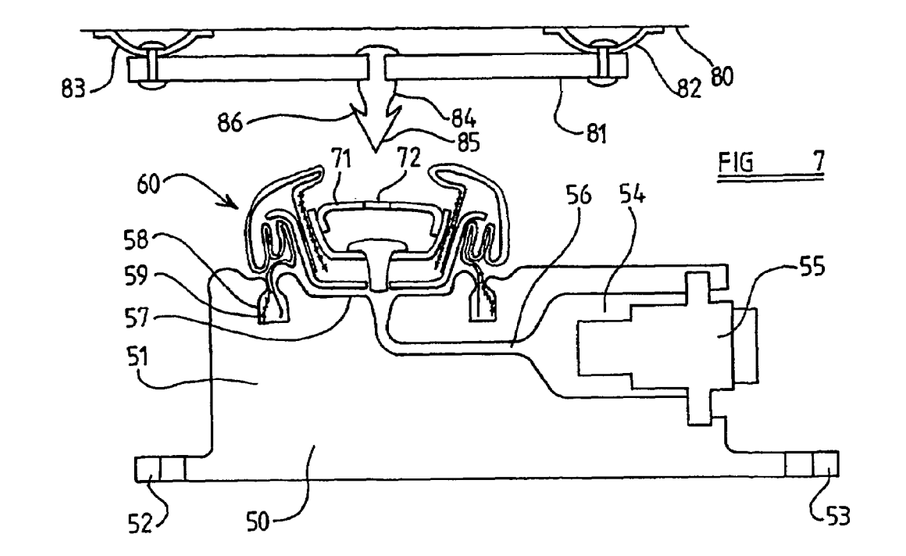
FIG. 7 is a diagrammatic sectional view of an alternative embodiment of the invention, prior to deployment of the safety arrangement.
Figure 8:
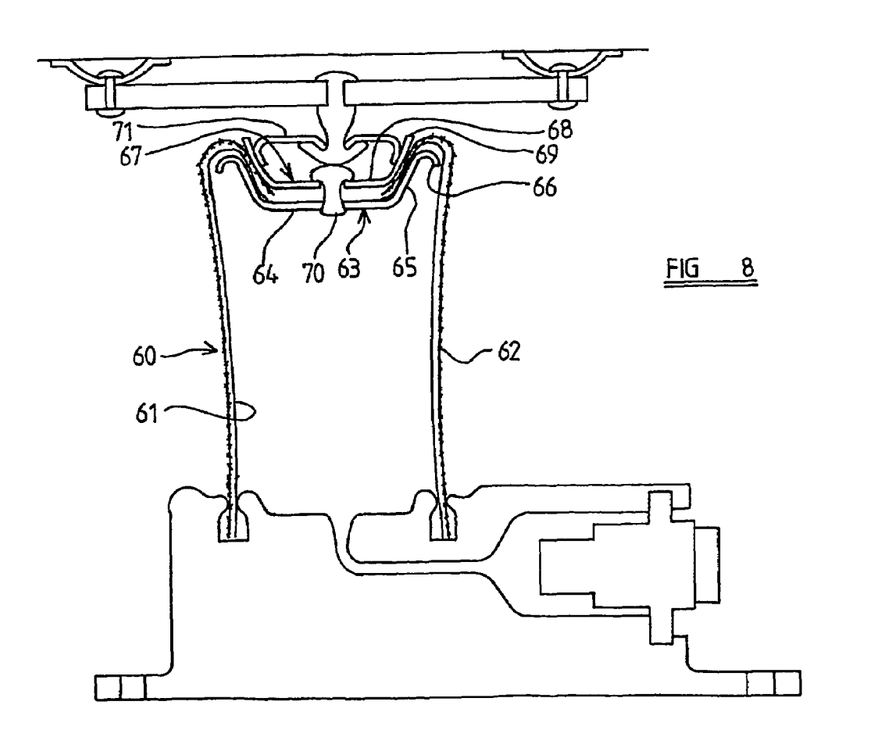
FIG. 8 is a view corresponding to FIG. 7 illustrating the arrangement of FIG. 7 after deployment.

FIGS. 7 and 8 illustrate an alternative embodiment of the invention. Referring to FIGS. 7 and 8 the described embodiment comprises a base housing 50, which may be formed as a casting of an appropriate lightweight metal such as aluminium or a tin and lead alloy, such as that sold under the Trade Mark MAZAC, or even a moulded plastics material. The base 50 is formed as a monolithic block 51, the block 51 having protruding apertured lugs 52, 53, by means of which the block may be secured in position. The monolithic block defines a cavity 54 which opens into one side face of the block, the cavity 54 containing a gas generator 55. The cavity 54 is connected, by means of a gas flow duct 56 formed within the monolithic block 51 to the base of a recess 57 which is formed at the upper surface of the block. The recess 57 is surrounded by a channel 58. The channel 58 is initially provided with two upstanding lips, the lips being formed of swageable or malleable material so that lips may be deformed inwardly towards each other.

As shown in FIGS. 7 and 8, an inflatable element 60 is provided, having a bead 59 surrounding an open mouth of the inflatable element. The bead 59 is received within the channel 58, and the lips of the channel are swaged or deformed inwardly so as to retain the bead 59 within the channel surrounding the recess 57.

The inflatable element 60 is formed from a cylindrical inner air-bag 61 which is relatively gas-tight, and an outer tubular sleeve 62, which may be made of fabric, for example, which does not permit any substantial radial expansion. The inflatable element 60 is thus a cylindrical air-bag, but in other embodiments a conical air-bag may be used.

The upper end of the inner air bag 61 and the sleeve 62 is trapped between a lower metal cup 63, which has a base 64, and an upwardly and outwardly directed side wall 65 which terminates with a rolled-over lip 66 presenting a curved upper surface, and an upper cup 67 which is nestingly received within the lower cup 63, the upper cup 67 having a base 68 and an upwardly and outwardly directed side wall 69. The upper cup and the lower cup are secured together by means of a rivet 70 which passes through co-aligned apertures formed in the centres of the bases 64 and 68 of the two cups. Thus, the upwardly and outwardly inclined side walls 65 and 69 trap between them the inner substantially gas-tight air-bag material 61 and the outer sleeve 62 in a substantially gas-tight manner.

The dimension of the lower cup 64 is such that at least part of the cup may be snugly received within the recess 57 formed in the upper surface of the monolithic block 51.

Provided within the upper cup 67 is a clip plate 71. The clip plate 71 extends across the open mouth of the upper cup 67 and defines a central aperture 72.

The base block 50 is adapted to be mounted at a position beneath the bonnet or hood on a motor vehicle. FIG. 7 illustrates the under-surface 80 of the bonnet or hood which is located above the base block 50. The bonnet or hood 80 carries a support plate 81 by means of two mounting brackets 82, 83. The support plate 81 supports a downwardly directly barb 84. The barb may be formed of a plastics material for example. The barb has a pointed lower end 85 and outwardly directed retaining tangs 86. The pointed end is located above and substantially in alignment with the aperture 72 in the catch plate 71.

In an initial condition of the safety arrangement, as shown in FIG. 7, the lower cup 63 is at least partially received within the recess 57, and the bonnet or hood 80 is spaced only a short distance above the base block 50. In the event that an impact with a pedestrian is sensed, the gas generator 55 is activated, and gas is injected into the chamber 54, with the gas flowing through the gas flow conduit 56 to the base of the recess 57. The gas serves to inflate the inflatable element 60. The length of the unit incorporating the inflatable element 60 thus increases. The rounded rolled over lips 66 prevent damage occurring to the inflatable element. The metal cups 63 and 67 move upwardly, and the aperture 72 in the catch plate 71, engages with the pointed lower end 85 of the barb 84. The catch plate moves upwardly, initially compressing the barbs 86 which pass through the aperture 72, and which then expand outwardly beneath the aperture, so that the barb 84 is securely connected to the catch plate 71.

As the cups 63 and 67 move upwardly, an upwardly force is applied to the hood or bonnet 80, causing the hood or bonnet 80 to lift.

The sleeve 62 is formed from a material or fabric that does not allow any substantial radial expansion. Thus the sleeve 62 effectively constrains the air-bag 60 to inflate only in the axial direction, and serves to prevent any lateral movement of the inflated air-bag. It is thought that a simple air-bag, without any inherent strength, might be unstable, allowing the bonnet to move in a direction other than the intended upwardly direction.

It is to be appreciated that when the clip plate of the upper cup has engaged the barb, when the inflatable element 60 is fully inflated, the engagement of the barb 84, with the clip plate 72, will prevent the bonnet moving further in the upward direction. Thus the described arrangement moves the hood or bonnet 80 upwardly by a predetermined amount. Any tendency for the bonnet 80 to move upwardly by a further amount will cause the barbs 86 to spread out and to engage the clip plate 71 more securely.

If a pedestrian should hit the bonnet while the bonnet is in the elevated condition, the pedestrian will apply, to the bonnet, a force tending to press the bonnet down. This will serve to compress the air-bag 61 raising pressure within the inflatable element 60. This rise in pressure may cause leakage of gas from the air-bag 61, with that gas flowing through the outer sleeve 62. This leakage of gas will allow the bonnet 80 to move downwardly while absorbing energy, and thus decelerating the pedestrian in a gradual and desired manner. The impact of the pedestrian with the bonnet will thus be damped.

In the present Specification "comprise" means "includes or consists of" and "comprising" means "including or consisting of".

The invention claimed is:

1. A safety arrangement for a vehicle having a hood or bonnet, the safety arrangement comprising a unit adapted to be located beneath the rear part of the hood or bonnet, the unit incorporating an inflatable element to increase the length of the unit in response to a signal from a sensor, the unit carrying a catch adapted to engage and retain part of the bonnet structure when the length of the unit is increased.

2. A safety arrangement according to claim 1 wherein the unit is provided with a boss provided with two diametrically opposed spring clips which constitute the catch.

3. A safety arrangement according to claim 2 wherein the boss is provided with a conical or tapering upper surface, each spring clip being provided with a free arm defining an inclined portion which is co-aligned with the conical surface, a lower end of which terminates with a radially inwardly directed arm.

4. A safety arrangement according to claim 2 wherein the unit incorporates a base, the base carrying a pyrotechnic charge, the unit further incorporating an upper plate carrying the boss, there being means connecting the base and the upper plate, the means connecting the base and upper plate adapted to increase in length on actuation of a gas generator.

5. An arrangement according to claim 4 wherein the means between the base and the upper plate comprise a sleeve formed of a plastically deformable material.

6. An arrangement according to claim 5 wherein the sleeve is provided with corrugations.

7. An arrangement according to claim 4 wherein the means between the base and the upper plate comprise a piston and cylinder arrangement.

8. An arrangement according to claim 7 wherein the piston incorporates a piston rod of plastically deformable material, and means are provided to retain the piston in an extended position.

9. An arrangement according to claim 1 wherein part of the unit, when the length thereof has been increased, is capable of plastic deformation.

10. An arrangement according to claim 1 wherein the unit is provided with means which enable the unit to be connected to part of the vehicle with a screwing action.

11. An arrangement according to claim 10 wherein the unit is provided with a quarter turn screw or a bayonet connection to secure the unit to part of the vehicle beneath the hood or bonnet.

12. An arrangement according to claim 10 wherein the bonnet structure is provided with an aperture to receive said catch, the aperture having a first dimension in one direction and a second larger dimension in another direction, so that after the catch has engaged an edge of the aperture, a quarter turn will release the catch.

13. A safety arrangement according to claim 1 wherein the unit incorporates an air-bag, the air-bag carrying the catch adapted to engage and retain part of the bonnet structure.

14. An arrangement according to claim 13 wherein the air-bag incorporates a sleeve formed from a material that does not permit substantial radial expansion of the sleeve.

15. An arrangement according to claim 14 wherein the sleeve is formed of fabric.

16. An arrangement according to claim 14 wherein the sleeve is provided with an inner lining of substantially gas-tight material.

17. An arrangement according to claim 14 wherein an upper part of the sleeve is trapped in a substantially gas-tight manner between two inter-engaging elements, one of the inter-engaging elements carrying said catch.

18. An arrangement according to claim 14 wherein a lower end of the sleeve is received within a groove formed in a base block.

19. An arrangement according to claim 13 wherein the catch comprises a catch plate adapted to engage and retain a barb that forms part of the bonnet structure.

20. An arrangement according to claim 13 wherein the air-bag is of cylindrical form.

21. A safety arrangement in a vehicle having a hood or bonnet, the safety arrangement comprising a unit located beneath the rear part of the hood or bonnet, the unit incorporating an inflatable element to increase the length of the unit in response to a signal from a sensor, the unit carrying a catch adapted to engage and retain part of the bonnet structure when the length of the unit is increased.

22. A safety arrangement for a vehicle having a hood or bonnet, the safety arrangement comprising:
   a gas generator; and
   a unit mountable beneath a rear part of the hood or bonnet, the unit incorporating an inflatable element, the gas generator capable of increasing a length of the unit in response to a signal from a sensor, the unit carrying a catch that can retainably engage part of the bonnet when the length of the unit is increased.

23. A safety arrangement according to claim 22, wherein the unit is provided with a boss having two diametrically opposed spring clips which constitute the catch.

24. A safety arrangement according to claim 23, wherein the unit includes a base and an upper plate, and a sleeve of plastically deformable material connecting the base and the upper plate, the sleeve increasing in length upon actuation of the gas generator.

25. A safety arrangement according to claim 23, wherein the unit includes a base and an upper plate, and a piston and cylinder arrangement connecting the base and the upper plate, the piston movable to an extended position upon actuation of the gas generator.

26. A safety arrangement according to claim 25, wherein the piston and cylinder arrangement include a piston rod of plastically deformable material and a ratchet arrangement to retain the piston in the extended position.

27. A safety arrangement according to claim 22, wherein the unit is provided with a quarter turn screw connection to enable the unit to be connected to part of the vehicle with a screwing action.

28. A safety arrangement according to claim 22, wherein the unit is provided with a bayonet connection to enable the unit to be connected to part of the vehicle.

29. A safety arrangement according to claim 22, wherein the unit incorporates an air-bag, the air-bag carrying the catch that can retainably engage a part of the bonnet.

30. A safety arrangement according to claim 29, wherein the air-bag incorporates a sleeve formed from a material that does not permit substantial radial expansion of the sleeve.

* * * * *

UNITED STATES PATENT AND TRADEMARK OFFICE
CERTIFICATE OF CORRECTION

| | | |
|---|---|---|
| PATENT NO. | : 7,159,685 B2 | Page 1 of 1 |
| APPLICATION NO. | : 10/471439 | |
| DATED | : January 9, 2007 | |
| INVENTOR(S) | : Heath Knight-Newbury et al. | |

It is certified that error appears in the above-identified patent and that said Letters Patent is hereby corrected as shown below:

In column 3, line 20, please delete ""bayone"-type fixing." and replace it with --"bayonet"-type fixing.--

Signed and Sealed this

Seventh Day of August, 2007

JON W. DUDAS
*Director of the United States Patent and Trademark Office*